US011420101B1

(12) United States Patent
Johnson

(10) Patent No.: US 11,420,101 B1
(45) Date of Patent: Aug. 23, 2022

(54) ICE HOCKEY STICK TEMPLATE TOOL, SYSTEM, AND PROCESSES FOR CREATING A PERSONAL TAILORED CURVED HOCKEY STICK BLADE

(71) Applicant: Andrew James Johnson, Burbank, CA (US)

(72) Inventor: Andrew James Johnson, Burbank, CA (US)

(73) Assignee: Andrew J. Johnson, Burbank, CA (US)

( * ) Notice: Subject to any disclaimer, the term of this patent is extended or adjusted under 35 U.S.C. 154(b) by 0 days.

(21) Appl. No.: 17/357,694

(22) Filed: Jun. 24, 2021

Related U.S. Application Data

(60) Provisional application No. 63/142,847, filed on Jan. 28, 2021.

(51) Int. Cl.
*A63B 59/70* (2015.01)
*A63B 102/22* (2015.01)
*A63B 102/24* (2015.01)

(52) U.S. Cl.
CPC .......... *A63B 59/70* (2015.10); *A63B 2102/22* (2015.10); *A63B 2102/24* (2015.10)

(58) Field of Classification Search
CPC ...... A63B 59/14; A63B 69/70; A63B 2102/22
See application file for complete search history.

(56) References Cited

U.S. PATENT DOCUMENTS

| | | | | |
|---|---|---|---|---|
| 2,334,860 A * | 11/1943 | Berger | ................... | A63B 59/70 473/561 |
| 5,816,962 A * | 10/1998 | Etersque | ................ | A63B 59/70 473/563 |
| 5,836,841 A * | 11/1998 | Fell | ......... | A63B 59/70 473/563 |
| 5,976,040 A * | 11/1999 | Liu | ......... | A63B 60/46 473/563 |
| 6,450,894 B1 * | 9/2002 | Sun | ......... | A63B 60/02 473/341 |
| 2001/0041633 A1 * | 11/2001 | Tiitola | ................... | A63B 59/70 473/560 |
| 2003/0153415 A1 * | 8/2003 | Gagnon | ................ | B29C 70/086 473/561 |

(Continued)

OTHER PUBLICATIONS https://customhockeysticks.ca/ (Year: 2020).*

*Primary Examiner* — Eugene L Kim
*Assistant Examiner* — Christopher Glenn

(57) ABSTRACT

An ice hockey stick template tool is disclosed for creating a personal tailored curved hockey stick blade of a hockey stick. The ice hockey stick template tool includes several blade parts that are configured to be assembled into a particular customized blade shape. The blade parts include several interchangeable heels, several interchangeable mids, and several interchangeable toes. A customized blade shape is created by a player assembling and adjusting one heel, one mid, and one toe, resulting in a blade profile which references a particular heel, a particular mid, and a particular toe. The blade profile is recorded and stored in a database that also stores all combinations of the interchangeable blade parts. The blade profile can then be transmitted electronically to a manufacturer or 3D printed to create the customized hockey stick the player desires.

15 Claims, 8 Drawing Sheets

(56) References Cited

U.S. PATENT DOCUMENTS

| | | | | |
|---|---|---|---|---|
| 2004/0235592 A1* | 11/2004 | McGrath | ............... | A63B 59/70 |
| | | | | 473/560 |
| 2006/0089215 A1* | 4/2006 | Jean | .................... | B29C 70/865 |
| | | | | 473/560 |
| 2009/0149283 A1* | 6/2009 | Garcia | .................. | A63B 60/00 |
| | | | | 473/563 |
| 2010/0016104 A1* | 1/2010 | Onodi | ................... | A63B 60/00 |
| | | | | 473/563 |
| 2012/0058843 A1* | 3/2012 | Neufeld | ............... | A63B 59/70 |
| | | | | 473/563 |
| 2012/0083370 A1* | 4/2012 | Girsky | .................. | A63B 60/00 |
| | | | | 473/563 |
| 2013/0040755 A1* | 2/2013 | Stites | .................... | A63B 53/04 |
| | | | | 473/345 |
| 2013/0116070 A1* | 5/2013 | Xun | ..................... | B29C 70/865 |
| | | | | 473/561 |

\* cited by examiner

ICE HOCKEY STICK TEMPLATE TOOL, SYSTEM, AND PROCESSES FOR CREATING A PERSONAL TAILORED CURVED HOCKEY STICK BLADE

CLAIM OF BENEFIT TO PRIOR APPLICATION

This application claims benefit to U.S. Provisional Patent Application 63/142,847, entitled "ICE HOCKEY STICK TEMPLATE TOOL FOR CREATING A PERSONAL TAILORED CURVED BLADE," filed Jan. 28, 2021. The U.S. Provisional Patent Application 63/142,847 is incorporated herein by reference.

BACKGROUND

Embodiments of the invention described in this specification relate generally to mechanisms and methods to personalize or customize the shape or characteristics of sporting goods and sports apparatuses, and more particularly, to an ice hockey stick template tool for creating a personal tailored curved hockey stick blade.

Traditionally, ice hockey players used straight bladed sticks in one or two lie angles. Around 1960-61, several professional hockey players in the NHL experimented with curved bladed sticks. They found that when struck, the puck accelerated faster than the commonly used straight bladed stick and moved in such a fashion that the goal tenders of the day had trouble following it.

Soon thereafter, other players made the transition to the curved bladed stick. Over the next fifty years, the sticks have developed by a multitude of varying materials and patterns, ranging from small to large heel to tip curves, combined with varying blade twists positions. These modifications, including the lie of the shaft to blade and shaft flex, were sent off to the manufacturer of choice, who then created a perfect individual pattern for the professional player. Most became available to the public who were then able to purchase a stick with the same customized pattern of a well-known player. Manufacturers only offered a limited number of such patterns for sale.

Hockey stick patterns for commercial retail sale to non-professional players are limited and the commercial availability of hockey sticks with such hockey stick patterns is also limited. Typically a pro-shop or local ice rank may have a rack of sticks from which to choose. However, the hockey sticks in the rack may not include patterns that some or many players need. This presents a challenge to the players who wish to get exactly what they need. Yet most hockey players are not professional players and do not have the resources needed to get a customized stick created. For instance, skilled amateur ice hockey players, including High School, Junior as well as Advanced Adult League, typically do not have the resources available to customize their own stick. Such skilled amateurs are left to finding a stick off the rack at a pro-shop that the player is willing to blindly try, but is not able to return. As these players spend between $85.00 and $150.00 on such equipment, the guesswork in finding such a stick is costly and aggravating, since such guesswork routinely leaves them struggling with one feature or another which is just not right for them. Beyond the pro-shop, many players shop on-line through large warehouse hockey equipment vendors due to a lack of a fully equipped, local pro-shops, which are normally ill supplied even when they are nearby. Those on-line hockey stick purchasing players spend approximately the same amount of money, plus shipping, for what they hope is a quality stick that fits their needs. Once again, such players often sacrifice one or two important features and have to settle with the imperfect stick as purchased.

Therefore, what is needed is a tool that allows a person to customize a hockey stick pattern as an adjustable ice hockey stick customization tool.

BRIEF DESCRIPTION

A novel ice hockey stick template tool, novel processes for creating a personal tailored curved hockey stick blade, and a novel ice hockey stick template system are disclosed for creating a personal tailored curved hockey stick blade of a hockey stick. In some embodiments, the ice hockey stick template tool includes a plurality of blade parts that are configured to be assembled into a particular customized blade shape. In some embodiments, the plurality of blade parts includes a plurality of interchangeable heels, a plurality of interchangeable mids, and a plurality of interchangeable toes. A customized blade shape is created by a player assembling one heel, one mid, and one toe. The player can adjust the customized blade shape by interchanging one or more of the blade parts. When assembled and adjusted according to a pattern specification of the player, a resultant blade profile which references a particular heel, a particular mid, and a particular toe is recorded and stored in a database that also stores all combinations of the interchangeable blade parts. The blade profile can then be transmitted electronically to a manufacturer or 3D printed to create the customized hockey stick the player desires.

In some embodiments, the processes for creating a personal tailored curved hockey stick blade comprise a physical process for creating a personal tailored curved hockey stick blade and a graphical virtual process for creating a personal tailored curved hockey stick blade.

In some embodiments, the ice hockey stick template system is a cloud-based system comprising a web server computing device that hosts an ice hockey stick template cloud application service for creating a personal tailored curved hockey stick blade.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
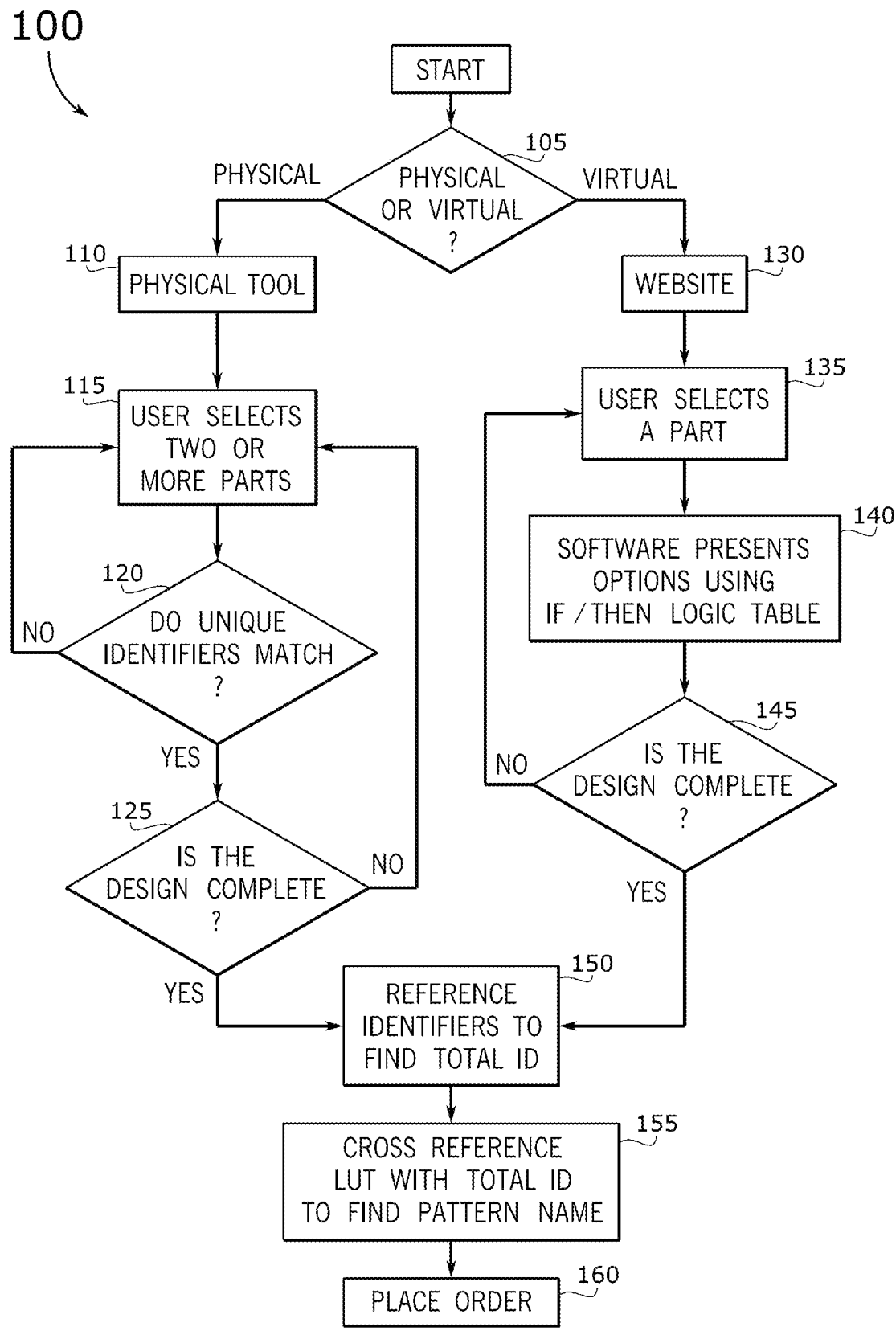
FIG. 1 conceptually illustrates a high level process for creating a personal tailored curved hockey stick blade in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel ice hockey stick template tool, processes for creating a personal tailored curved hockey stick blade, and an ice hockey stick template system for creating a personal tailored curved hockey stick blade. In some embodiments, the ice hockey stick template tool includes a plurality of blade parts that are configured to be assembled into a particular customized blade shape. In some embodiments, the plurality of blade parts includes a plurality of interchangeable heels, a plurality of interchangeable mids, and a plurality of interchangeable toes. A customized blade shape is created by a player assembling one heel, one mid, and one toe. The player can adjust the customized blade shape by interchanging one or more of the blade parts. When assembled and adjusted according to a pattern specification of the player, a resultant blade profile which references a particular heel, a particular mid, and a particular toe is recorded and stored in a database that also stores all combinations of the interchangeable blade parts. The blade profile can then be transmitted electronically to a manufacturer or 3D printed to create the customized hockey stick the player desires.

In some embodiments, the processes for creating a personal tailored curved hockey stick blade comprise a physical process for creating a personal tailored curved hockey stick blade and a graphical virtual process for creating a personal tailored curved hockey stick blade.

In some embodiments, the ice hockey stick template system is a cloud-based system comprising a web server computing device that hosts an ice hockey stick template cloud application service for creating a personal tailored curved hockey stick blade.

As stated above, hockey stick patterns for commercial retail sale to non-professional players are limited and the commercial availability of hockey sticks with such hockey stick patterns is also limited. Typically a pro-shop or local ice rank may have a rack of sticks from which to choose. However, the hockey sticks in the rack may not include patterns that some or many players need. This presents a challenge to the players who wish to get exactly what they need because most hockey players are not professional players and do not have the resources needed to get a customized stick created. Embodiments of the ice hockey stick template tool described in this specification solve such problems by an interchangeable parts-based modeling tool, which in physical form or in digital electronic presentation, allows a player to build/customize a pattern that fits their liking.

The ice hockey stick template tool of the present disclosure may be comprised of the following elements. This list of possible constituent elements is intended to be exemplary only and it is not intended that this list be used to limit the ice hockey stick template tool of the present application to just these elements. Persons having ordinary skill in the art relevant to the present disclosure may understand there to be equivalent elements that may be substituted within the present disclosure without changing the essential function or operation of the ice hockey stick template tool.

1. Heel (a plurality of different interchangeable blade heel parts)

2. Mid (a plurality of different interchangeable mid blade parts)

3. Toe (a plurality of different interchangeable blade toe parts)

4. A mid-heel connector along a heel-facing edge of the mid blade part

5. A toe-mid connector along a mid-facing edge of the toe blade part

6. A heel-mid connector along a mid-facing edge of the heel blade part

7. A mid-toe connector along a toe-facing edge of the mid blade part

The ice hockey stick template tool of the present disclosure generally works by creating a combination of three blade parts—one heel, one mid, and one toe. When connected together, they combine to create a customized blade pattern. Since each part is unique, a "final curve" for the blade is only possible when the sum of any three parts are fit together. This results in a custom blade profile which can, along with the individual parts assembled in the final curve, be cross-referenced in a pre-defined database of combinations and ultimately produced. While the individual parts shown in the drawings reference a heel (1), a mid (2), and a toe (3), the drawings also illustrate how the blade parts interconnect in a bottom view. The interconnections between the blade parts is further shown in an exploded view on a second sheet of drawings. In particular, the mid (2) blade part includes the mid-heel connector (4) and the mid-toe connector (7), while the heel (1) blade part includes the heel-mid connector (6) and the toe (3) blade part includes the toe-mid connector (5). As shown, the heel-mid connector (6) of the heel (1) blade part interlocks with the mid-heel connector (4) of the mid (2) blade part. Similarly, the mid-toe connector (7) of the mid (2) blade part interlocks with the toe-mid connector (5) of the toe (3) blade part. By connecting different combinations of the blade parts, a player can find, through trial and error, the right combination of blade parts that corresponds to the curve the player desires for the hockey stick.

To make the ice hockey stick template tool of the present disclosure, all the available blade parts may be manufactured in a traditional facility or 3D printed on-demand. The 3D printed blade parts would be available after selection by the player through interaction with a graphical user interface (GUI) of a computing device or mobile device, thereby providing for an in-person physical experience to build the stick. Then the stick they make can be looked up in the database for a match. Otherwise the process can be equally achieved by an online website where a 3D interface allows for the same virtual assembly, but the physical blade parts are not 3D printed. Also, a stand-alone hockey stick shaft could be an added element for the insertion of the final assembly of stick blade parts to be inserted into to give the player better "perspective" of what the complete assembly would look and feel like in person.

To use the ice hockey stick template tool of the present disclosure, the player would walk into a store (for example, a pro shop) and use a box of parts to shuffle and make their desired curve. After their curved blade was assembled the overseer would take the assembled "blade" and read the markings on the individual pieces to build a 3 piece combination code. This combination code can then be referenced to a pre-determined curve in a database which will have an identifier for local supply identification or ordering purposes. The online version of this process could be based on a website and a 3D modeling interface to achieve the same solution (a unique 3 piece assembly that has a 3 piece combination code to reference back to a real part).

By way of example, FIG. 1 conceptually illustrates a high level process for creating a personal tailored curved hockey stick blade 100 in some embodiments. As shown in this figure, the high level process for creating a personal tailored curved hockey stick blade 100 starts by determining (at 105) the type of ice hockey stick template tool being utilized by a user to create a personal tailored curved hockey stick blade. In some embodiments, the ice hockey stick template tool is a physical tool. In some embodiments, the ice hockey stick template tool is a virtual tool. As a virtual tool, the ice hockey stick template tool of some embodiments is a graphical ice hockey stick template tool that the user interacts with on a screen of a computing device. In some embodiments, the graphical ice hockey stick template tool is selected from a user interface, such as a website for creating a personal tailored curved hockey stick blade. Details of using the virtual graphical ice hockey stick template tool are further described below.

On the other hand, when the user choices the physical ice hockey stick template tool, the high level process for creating a personal tailored curved hockey stick blade 100 proceeds through a series of steps, starting with the user accessing the physical ice hockey stick template tool (at 110) for creating the personal tailored curved hockey stick blade. The physical ice hockey stick template tool is manipulable as a tangible, real-world mechanism by which the user is able to assemble interlocking blade parts together. When appropriately matched and connected together, the interlocking blade parts form a particular curve pattern or path. In some embodiments, the physical ice hockey stick template tool supports at least two blade parts that can be interlocked together to assemble a personal tailored curved hockey stick blade. In a preferred embodiment, the physical ice hockey stick template tool supports assembly with three blade parts which, when interlocked together, form the personal tailored curved hockey stick blade. For example, the user selects a blade toe, a mid-blade part, and a blade heel part to connect together and assemble the personal tailored curved hockey stick blade. Examples of personal tailored curved hockey stick blades in three-part configuration are described below, by reference to FIGS. 2-4, examples of personal tailored curved hockey stick blades in two-part configuration are described below, by reference to FIGS. 7-9, and an example of a personal tailored curved hockey stick blade in a four-part configuration is described below, by reference to FIG. 10.

After utilization of the physical ice hockey stick template tool is made (at 110), the high level process for creating a personal tailored curved hockey stick blade 100 proceeds to the next step during which the user selects two or more interlocking blade parts (at 115). Next, the high level process for creating a personal tailored curved hockey stick blade 100 proceeds to a step during which unique identifiers of the selected blade parts are compared to find matching identifiers. In some embodiments, the blade parts have unique identifiers which, when matched, allow for interconnection between the blade parts and which, when not matched, prevent effective interconnection of the blade parts. For example, if the user selects two or more blade parts that all have different unique identifiers, the selected blade parts would not be able to interlock effectively to create a personal tailored curved hockey stick blade. Thus, the high level process for creating a personal tailored curved hockey stick blade 100 determines (at 120) whether the unique identifiers of the selected blade parts are matching. This is performed in pairs of selected blade parts. For example, if the user selects three blade parts, the user will check the connector of a first selected blade part to each connector of each other blade part. The matching identifiers ensure that assemble order and orientation of the blade parts are proper and allowed.

In some embodiments, when non-matches for the selected blade parts occur, the user goes back to the selection stage (at 115) to choose different blade parts. On the other hand, when the unique identifiers of pairs of blade parts are matching, the user assembles the interlocking blade parts to form the personal tailored curved hockey stick blade. The user can then see the design in a visual way and simulate usage of the personal tailored curved hockey stick blade to ensure that the design is suitable for the user's needs. Thus, after assembly of the interlocking blade parts (with matching unique identifiers), a design or form of the personal tailored curved hockey stick blade will be apparent, and the user will be able to inspect the personal tailored curved hockey stick blade to determine if it is OK or not. Accordingly, the high level process for creating a personal tailored curved hockey stick blade 100 proceeds to the next step for determining (at 125) whether the design of the assembled personal tailored curved hockey stick blade is complete to the user's needs or not complete, incorrect, or otherwise unsuitable according to the user's preferences. When the design is not complete, the high level process for creating a personal tailored curved hockey stick blade 100 returns to the blade part selection step (at 115).

On the other hand, when the design of the personal tailored curved hockey stick blade is determined (at 125) to be complete, the high level process for creating a personal tailored curved hockey stick blade 100 then proceeds to another step to reference the identifiers of the matching blade parts to identify a total or composite identification (at 150) of the assembled personal tailored curved hockey stick blade. The high level process for creating a personal tailored curved hockey stick blade 100 then involves a step for cross referencing a lookup table (LUT) with the total/composite identification to identify a pattern name (at 155) for the personal tailored curved hockey stick blade. In some embodiments, after the pattern name is identified, the high level process for creating a personal tailored curved hockey stick blade 100 continues to the next step to place an order (at 160) for the personal tailored curved hockey stick blade to be created or manufactured for the user.

Figure 5:
FIG. 5 conceptually illustrates a comparison of a straight linear path to a curvilinear path of a personal tailored curved hockey stick blade in some embodiments.

In some embodiments, the pattern name includes an inherent curvilinear path or curvilinear pattern. In some embodiments, the curvilinear path or pattern demonstrates deviation from a straight linear path of an uncurved ice hockey stick blade which a person may purchase off the rack at a commercial or retail outlet. Furthermore, the curvilinear path can be compared to a final manufactured or created ice hockey stick that embodies the personal tailored curved hockey stick blade intended for the user. In this way, the user gets a final ice hockey stick that matches the personal tailored curved hockey stick blade assembled from the multiple interlocking blade parts selected by the user. An example comparison of a straight linear path to a curvilinear path of a personal tailored curved hockey stick blade is described below, by reference to FIG. 5.

Turning back to the determination (at 105) of which type of ice hockey stick template tool the user is utilizing to create the personal tailored curved hockey stick blade, when the virtual tool is utilized by the user, then the high level process for creating a personal tailored curved hockey stick blade 100 proceeds to a step for visually outputting a user interface, such as a website (at 130), on a screen of a computing device to allow the user to interact with the graphical ice hockey stick template tool, the user selects a blade part (at 135). In some embodiments, the high level process for creating a personal tailored curved hockey stick blade 100 then performs a step for presenting (at 140) blade part selection options and blade part assembly/interconnection options to the user. In some embodiments, the blade part selection options and the blade part assembly/interconnection options are based on automatic identification of matching identifiers that are used to filter the options presented to the user. In this way, the user is not required to manually view the unique identifiers of the blade part connectors in order to assembly an effective personal tailored curved hockey stick blade. In some embodiments, the high level process for creating a personal tailored curved hockey stick blade 100 is implemented in part by a software application which automatically identifies the blade part selection options and blade part assembly/interconnection options based on logical processing of each user-selected blade part and its unique identifier(s) in view of other possible connecting blade parts and their respective identifiers. In some embodiments, the software application also considers all selected blade parts in an aggregate manner to present options for further selections of matching blade parts which would be effective additions to the previously selected (in aggregate) blade parts.

After identifying and automatically presenting the blade part selection options and blade part assembly/interconnection options, the high level process for creating a personal tailored curved hockey stick blade 100 of some embodiments determines (at 145) whether the design of the personal tailored curved hockey stick blade is complete. When the design is not complete, the high level process for creating a personal tailored curved hockey stick blade 100 returns to the step at which the user selects another blade part (at 135). On the other hand, when the design of the personal tailored curved hockey stick blade is determined (at 145) to be complete, then the high level process for creating a personal tailored curved hockey stick blade 100 proceeds to the step for referencing the identifiers of the matching blade parts to identify a total or composite identification (at 150) of the assembled personal tailored curved hockey stick blade. The high level process for creating a personal tailored curved hockey stick blade 100 then involves a step for cross referencing a lookup table (LUT) with the total/composite identification to identify a pattern name (at 155) for the personal tailored curved hockey stick blade. In some embodiments, after the pattern name is identified, the high level process for creating a personal tailored curved hockey stick blade 100 continues to the next step to place an order (at 160) for the personal tailored curved hockey stick blade to be created or manufactured for the user.

As shown by the flow chart in FIG. 1, the high level process for creating a personal tailored curved hockey stick blade 100 presents at least two ways for a user to create a design for a personal tailored curved hockey stick blade. The user may be a consumer at a store, a retail staff member at a store helping a consumer customize an ice hockey stick, a consumer or staff member in the store interacting with the user interface on a screen of an in-store computing device that allows the automated identification of options, etc., in creating a personalized ice hockey stick, or an online consumer selecting blade parts from a website that is hosted by an ice hockey stick template cloud application service for creating a personal tailored curved hockey stick blade cloud service. An example of an ice hockey stick template cloud application service for creating a personal tailored curved hockey stick blade cloud service is further described below, by reference to FIG. 11.

Now turning to several example views of creating a personal tailored curved hockey stick blade by way of a physical or virtual/graphical ice hockey stick template tool that supports a three-part blade configuration.

Figure 2:
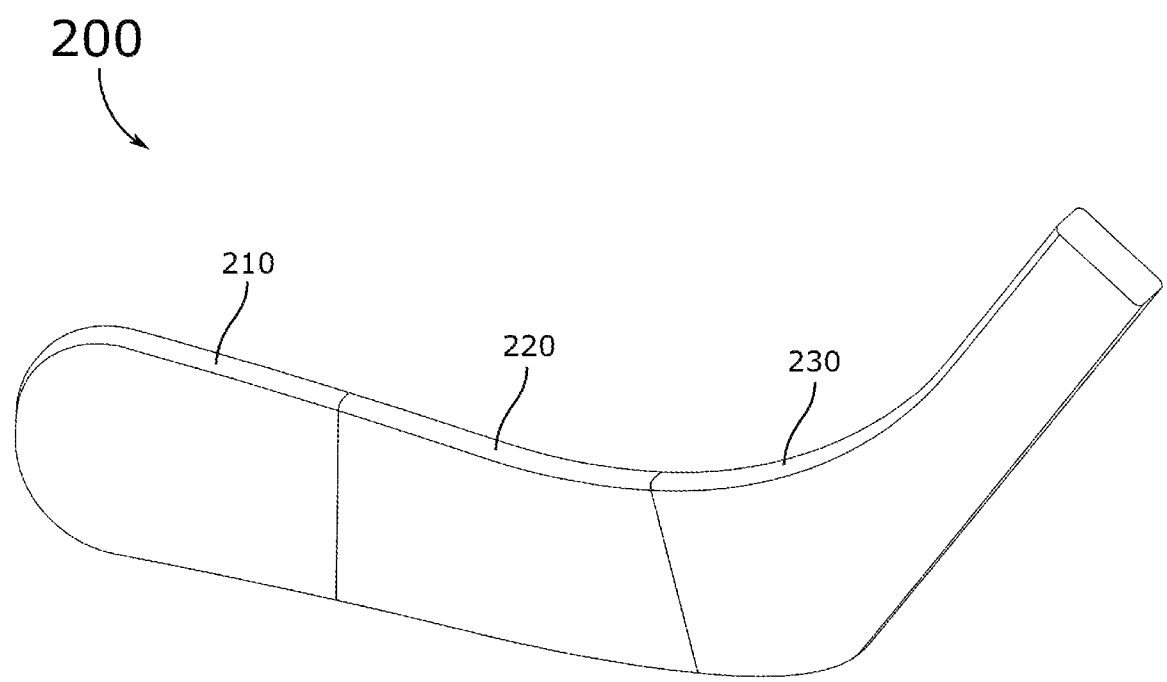
FIG. 2 conceptually illustrates a perspective view of an ice hockey stick template tool in a three-part configuration in some embodiments for creating a personal tailored curved hockey stick blade.

By way of example, FIG. 2 conceptually illustrates a perspective view creating a personal tailored curved hockey stick blade by way of a physical or virtual/graphical ice hockey stick template tool that supports a three-part blade configuration 300. As shown, a personal tailored curved hockey stick blade is assembled from a first blade part 210, a second blade part 220, and a third blade part 230. The first blade part 210 is a toe blade part, the second blade part 220 is a mid-blade part, and the third blade part 230 is a heel blade part 230. Lines are shown between the three blade parts 210-230 which demonstrate where the individual blade parts are interconnected. This is further demonstrated in FIG. 3.

Figure 3:
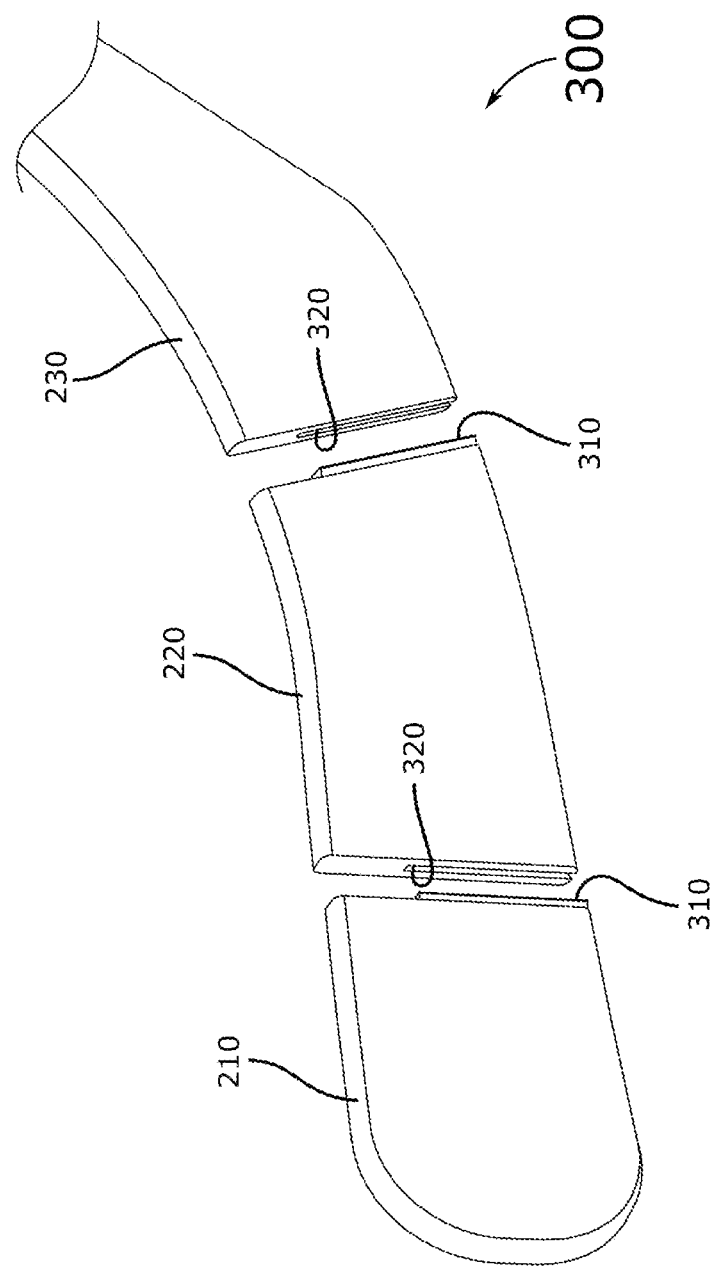
FIG. 3 conceptually illustrates an exploded perspective view of an ice hockey stick template tool in the three-part configuration in some embodiments for creating a personal tailored curved hockey stick blade.

Specifically, FIG. 3 conceptually illustrates an exploded perspective view 300 of an ice hockey stick template tool in the three-part configuration in some embodiments for creating a personal tailored curved hockey stick blade. As shown in this figure, a tongue connector 310 is attached to a connecting edge of the first blade part 210, a groove connector 320 is included along a first connecting edge of the second blade part 220 while a tongue connector 310 is attached to a second connecting edge of the second blade part 220, and a groove connector 320 is included along a connecting edge of the third blade part 230. The tongue connector 310 attached to the connecting edge of the first blade part 210 is aligned with the groove connector 320 included along the first connecting edge of the second blade part 220. Similarly, the tongue connector 310 attached to the second connecting edge of the second blade part 220 is aligned with the groove connector 320 included along the connecting edge of the third blade part 230. The respective alignments are based on curvature of the blade part(s) and orientation, as well as slope of blade part(s) with respect to a connection of the (assembled) personal tailored curved hockey stick blade to a stick component of the hockey stick.

Figure 4:
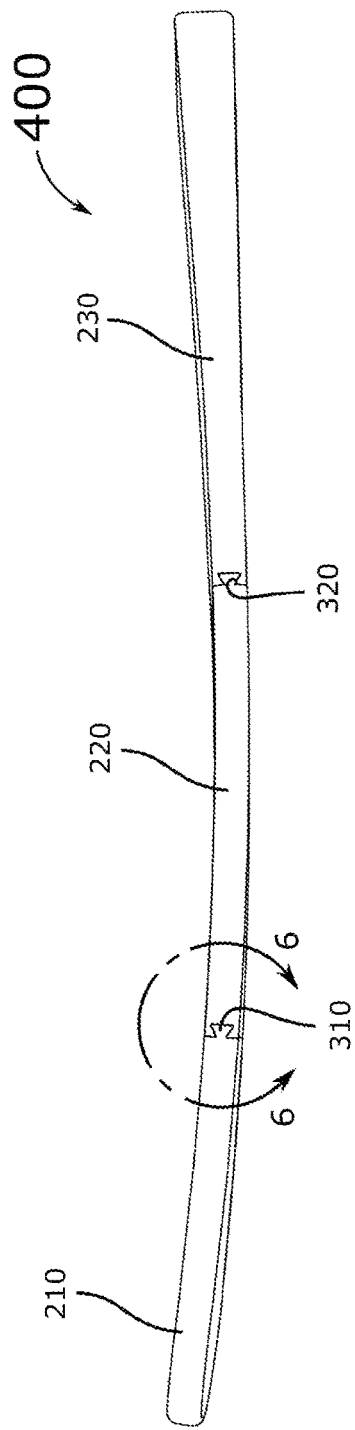
FIG. 4 conceptually illustrates a bottom plan view of an ice hockey stick template tool in the three-part configuration in some embodiments for creating a personal tailored curved hockey stick blade.

Now turning to another view, FIG. 4 conceptually illustrates a bottom plan view 400 of an ice hockey stick template tool in the three-part configuration in some embodiments for creating a personal tailored curved hockey stick blade. This figure demonstrates how attachment of the tongue connector 310 to the groove connector 320 between different blade parts is based on an interlocking mechanism. Also apparent in this view of the assembled blade parts 210-230 is an inherent curvature of the personal tailored curved hockey stick blade. This inherent curvature is described further below, by reference to FIG. 5. As indicated by the circular line 6-6 in this figure, a more detailed view of the interlocking mechanism is demonstrated and described by reference to FIG. 6. Also Turning to FIG. 5, a comparison of a straight linear path to a curvilinear path of the personal tailored curved hockey stick blade 500 is shown. As shown, the curvilinear path 510 deviates from the straight linear path 520. The curvilinear path is a resultant curved line that is inherent in the fully assembled personal tailored curved hockey stick blade that results when the first blade part 210 is interconnected with the second blade part 220 and the second blade part 220 is interconnected with the third blade part 230.

In some embodiments, the curvilinear path 510 is associated with the pattern name identified for the fully assembled personal tailored curved hockey stick blade in the LUT (based on aggregated or composited unique identifiers of the respective blade parts used to assemble the personal tailored curved hockey stick blade) to place an order for the personal tailored curved hockey stick blade after the design is completed. In some embodiments, the pattern name is transmitted to an order processing facility, such as a manufacturer or other outlet, with metadata that includes numerical representations of the curvilinear path with respect to the straight linear path. The numerical representations include length of the personal tailored curved hockey stick blade, deviation measurements between the curvilinear path and the straight linear path, and other such numerical data.

If the user had selected a different blade part for the toe of the personal tailored curved hockey stick blade instead of the first blade part 210, the resulting curved line of the fully assembled personal tailored curved hockey stick blade would have been different (assuming that the user would have selected another toe-blade part with a unique identifier that matches the identifier associated with the first connecting edge and groove connector 320 of the second blade part 220).

Figure 6:
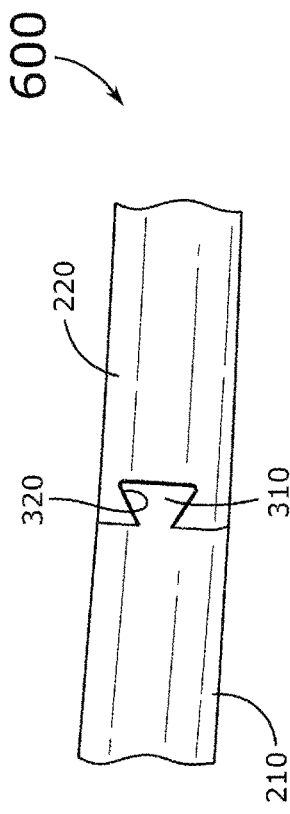
FIG. 6 conceptually illustrates a detail bottom plan view of an ice hockey stick template tool in the three-part configuration taken along ling 6-6 in FIG. 4.

As noted above, the interlocking mechanism enables the different and separate blade parts to be assembled together in a way that allows a person to simulate a look and feel of a personal tailored curved hockey stick blade. FIG. 6 conceptually illustrates a detail bottom plan view 600 of an ice hockey stick template tool in the three-part configuration taken along ling 6-6 in FIG. 4. As shown in this figure, the tongue connector 310 of the first blade part 210 attaches to the groove connector 320 of the second blade part 220 in a way that interlocks the tongue connector 310 within a cavity of the groove connector 320. While a particular shape of the cavity for the groove connector 320 and a corresponding shape of the tongue connector 310 are shown in this figure, it is conceived that other shapes of the cavity of the groove connector 320 and the corresponding tongue connector 310 are possible. For instance, the tongue connector 310 could be formed or shaped like a circle while the cavity of the groove connector 320 can have a circle-shaped cavity that is only large enough to slide the tongue connector 310 snug into its interlocking position within the cavity of the groove connector 320.

Figure 8:
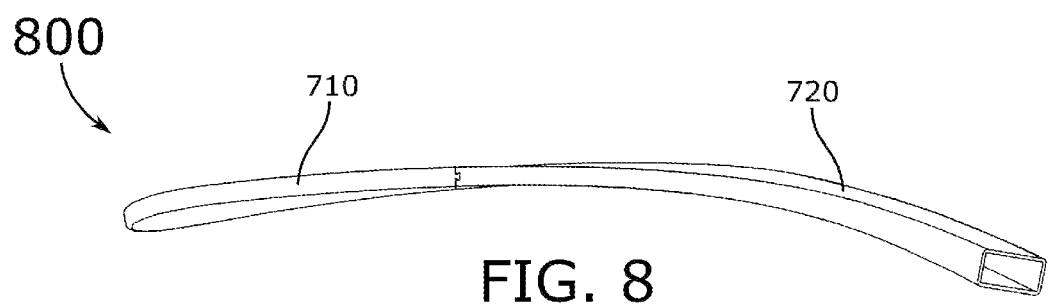
FIG. 8 conceptually illustrates a top plan view showing an ice hockey stick template tool in the two-part configuration in some embodiments for creating a personal tailored curved hockey stick blade.
Figure 9:
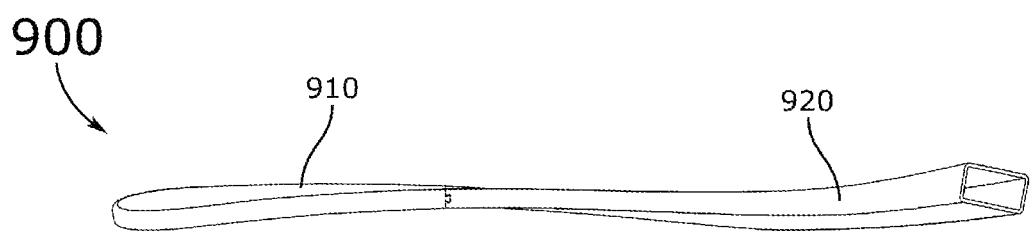
FIG. 9 conceptually illustrates a top plan view showing an ice hockey stick template tool in another two-part configuration in some embodiments for creating a personal tailored curved hockey stick blade.

While the examples described above, by reference to FIGS. 2-4 and 6, pertain to creation of a personal tailored curved hockey stick blade in a three-part blade configuration, several other example views of creating a personal tailored curved hockey stick blade by way of a physical or virtual/graphical ice hockey stick template tool that supports a two-part blade configuration are described next, by reference to FIGS. 7-9.

Figure 7:
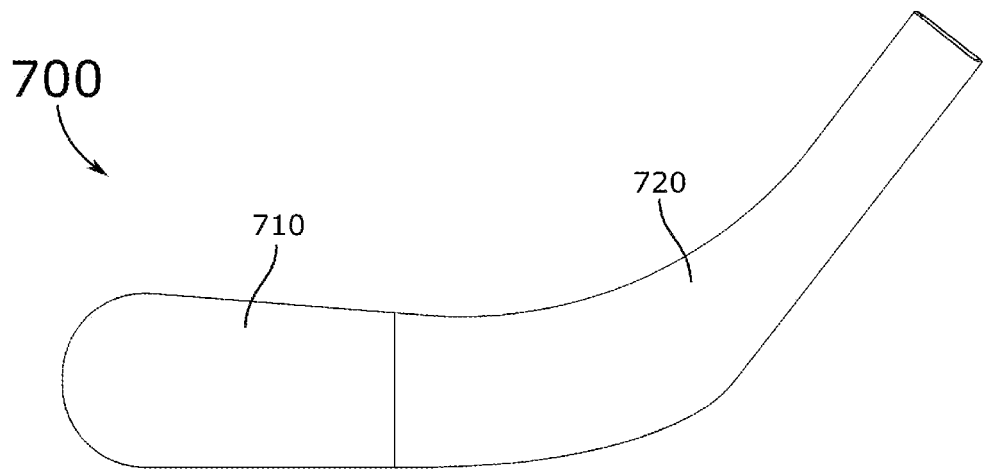
FIG. 7 conceptually illustrates a front elevation view of an ice hockey stick template tool in a two-part configuration in some embodiments for creating a personal tailored curved hockey stick blade.

In particular, FIG. 7 conceptually illustrates a front elevation view of a personal tailored curved hockey stick blade created by way of a physical or virtual/graphical ice hockey stick template tool that supports a two-part blade configuration 700. As shown in this figure, the personal tailored curved hockey stick blade is created based on a first blade part 710 that is connected to a second blade part 720. Turning to FIG. 8, a top plan view of the personal tailored curved hockey stick blade is shown in the two-part configuration. Specifically, a tongue connector of the first blade part 710 interconnects to a grove connector of the second blade part 720. The resulting personal tailored curved hockey stick blade has an inherent blade curve. By contrast, a different blade curve results when a different first blade part 910 is interconnected to a different second blade part 920 by way of a physical or virtual/graphical ice hockey stick template tool that supports a two-part blade configuration, as demonstrated and described by reference to FIG. 9, which shows the comparatively different resultant blade curve in a top plan view 900. Depending on comparison and matching of the unique identifiers corresponding to the first blade part 710, the second blade part 720, the different first blade part 910, and the different second blade part 920, in some embodiments it is possible to connect the first blade part 710 to the different second blade part 920 and, similarly, connect the different first blade part 910 to the second blade part 720 showing an ice hockey stick template tool in another two-part configuration in some embodiments for creating a personal tailored curved hockey stick blade.

Like the examples of creating a personal tailored curved hockey stick blade in a three-part blade configuration and in a two-part configuration described above, by reference to FIGS. 2-4 and 6 and FIGS. 7-9, respectively, another example view of creating a personal tailored curved hockey stick blade by way of a physical or virtual/graphical ice hockey stick template tool that supports a four-part blade configuration is described next, by reference to FIG. 10.

Figure 10:
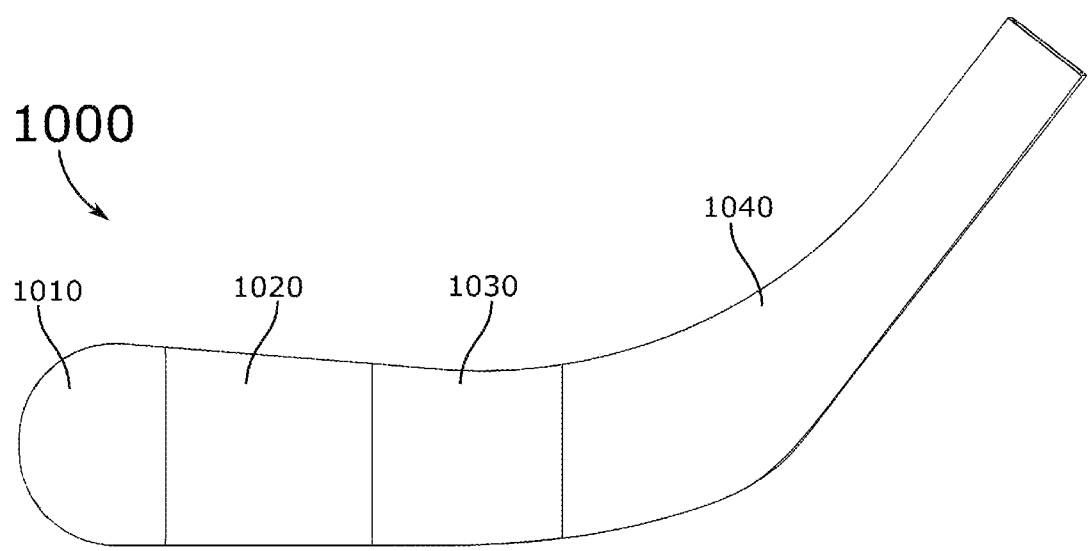
FIG. 10 conceptually illustrates a front elevation view of an ice hockey stick template tool in a four-part configuration in some embodiments for creating a personal tailored curved hockey stick blade.

Thus, turning to and by way of reference, FIG. 10 conceptually illustrates a front elevation view of creating a personal tailored curved hockey stick blade by way of physical or virtual/graphical ice hockey stick template tool that supports a four-part configuration 1000. As shown in this figure, a first blade part 1010 connects to a second blade part 1020. The second blade part 1020 connects to a third blade part 1030. The third blade part 1030 connects to a fourth blade part 1040. In this example, the second blade part 1020 and the third blade part 1030 are both mid-blade parts. However, the unique identifiers associated with the connectors along the edges of the second blade part 1020 and the third blade part 1030 are configured to prevent mis-connections that might occur if the user were to swap the positions of the second blade part 1020 and the third blade part 1030. Specifically, the user is prevented from interlocking the blade parts in the sequence of the first blade part 1010 being interlocked to the third blade part 1030, the third blade part 1030 being interlocked to the second blade part 1020, and the second blade part being interlocked to the fourth blade part 1040. The unique identifiers would help a user of the physical ice hockey stick template tool to navigate this sequence of interconnections (matching identifiers for a correct interlocking sequence of connecting parts and avoiding mis-matched identifiers between interlocked) while the virtual/graphical ice hockey stick template tool would automatically identify the possible blade parts with matching identifiers that the user could select after the first, or each subsequent, blade part selection in the graphical user interface, website, cloud application service, software interface, 3D virtual interface (for goggles with associated 3D rendering and display software), enhanced reality interfaces such as augmented reality (A/R) and virtual reality (V/R) interfaces, etc. Thus, even though the second blade part 1020 and the third blade part 1030 in this four-part configuration 1000 for creating a personal tailored curved hockey stick blade are both mid-blade parts, they are not equivalent mid-blade parts. Thus, the unique identifiers that correspond to the connecting edges of the blade parts are essential for making effective personal tailored curved hockey stick blade by way of the physical ice hockey stick template tool and/or the virtual/graphical ice hockey stick template tool described in this specification.

Figure 11:
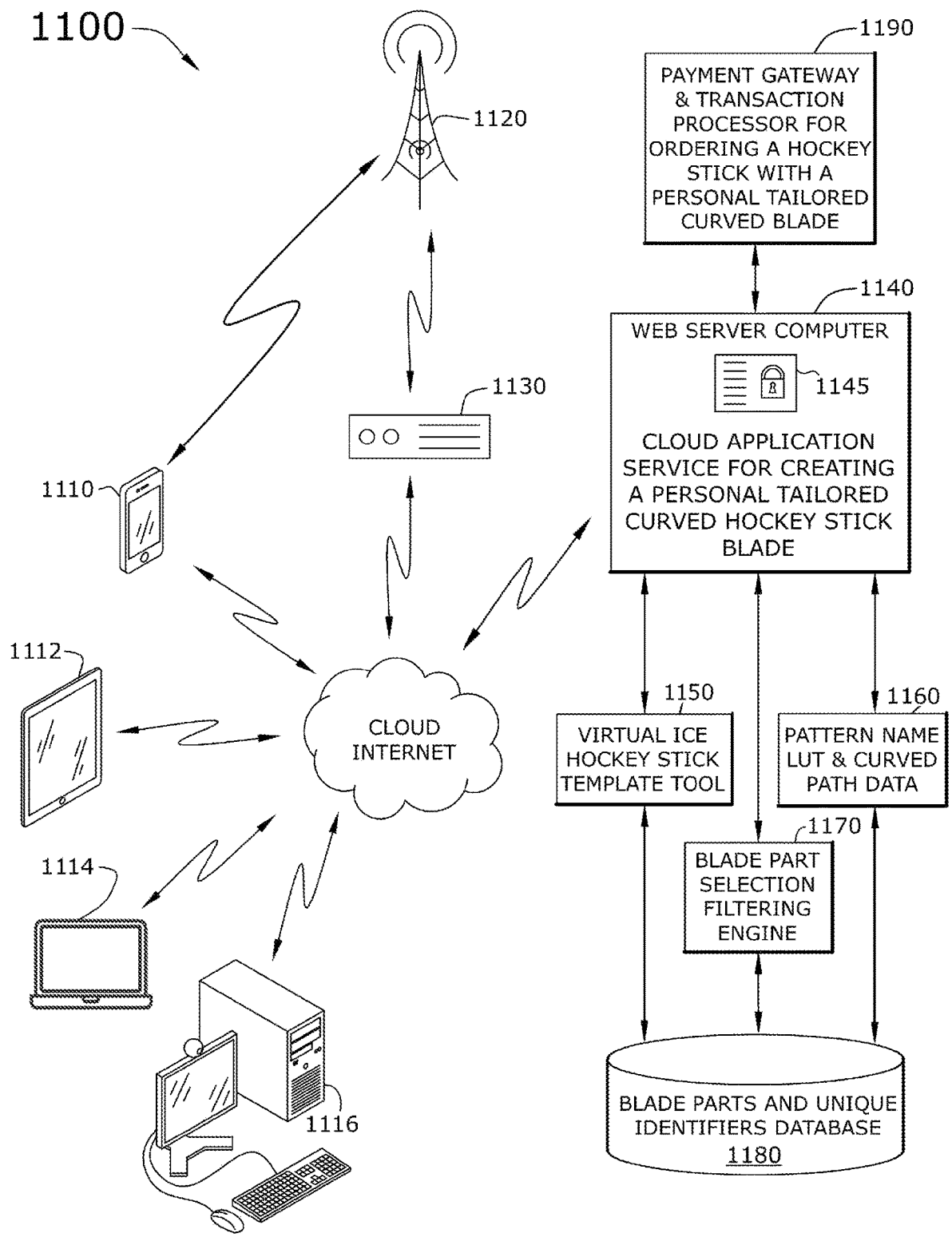
FIG. 11 conceptually illustrates a network architecture of an ice hockey stick template system that provides a cloud application service for creating a personal tailored curved hockey stick blade in some embodiments.

Now turning to another embodiment, FIG. 11 conceptually illustrates a network architecture of an ice hockey stick template system 1100 that provides an ice hockey stick template cloud application service for creating a personal tailored curved hockey stick blade in some embodiments. As shown in this figure, the network architecture of the ice hockey stick template system 1100 includes a user mobile device 1110, a user tablet computing device 1112, a user laptop computing device 1114, and a user computer 1116. The ice hockey stick template system 1100 also includes a wireless communication point 1120 (e.g., a cell tower for cellular data communication), a network gateway 1130, a web server computer 1140 that hosts an ice hockey stick template cloud application service for creating a personal tailored curved hockey stick blade, an encryption module 1145 that protects and secures user orders and payment information through a payment gateway & transaction processor 1190 for ordering a hockey stick with a personal tailored curved blade as completed by a user by interaction with a virtual ice hockey stick template tool 1150, a pattern name look-up table (LUT) with curved path data 1160, a blade part selection filtering engine 1170, and a blade parts and unique identifiers cloud database 1080.

When user with a computing device, such as the user mobile device 1110, the user tablet computing device 1112, the user laptop computing device 1114, or the user computer 1116, connects over the Internet to the web server computer 1140 to access the ice hockey stick template cloud application service for creating a personal tailored curved hockey stick blade, the user is able to use the virtual ice hockey stick template tool 1150 to start creating a personal tailored curved hockey stick blade. Depending on implementation or computing device configurations, the user may access a website implementation of the ice hockey stick template cloud application service (e.g., via the user laptop computing device 1114 or the user computer 1116) or may access a mobile application cloud service implementation of the ice hockey stick template cloud application service (e.g., by way of a mobile app implementation running on the user mobile device 1110 or the user tablet computing device 1112). Also, the user may be a person who is physically visiting a commercial retailer or other entity with a system in place that allows the user to make such custom curved blade preferences when ordering or purchasing a hockey stick. Thus, any location can be the location from which the user operates and interacts with the computing device to connect to the web server computer 1140 and access the ice hockey stick template cloud application service for creating a personal tailored curved hockey stick blade.

Furthermore, any computing device can be used to facilitate the user in this selection process. For instance, other computing devices and user interfaces are also supported, such as augmented reality (A/R) overlays on website interface or on tangible real-world hockey sticks accessible to the user, smart watch devices, or virtual reality (VR) goggles that visually output a 3D submersed virtual world in which the user may select blade parts from virtual bins or containers and virtually assembly a personal tailored curved hockey stick blade, complete a transaction to order and purchase a hockey stick with the personal tailored curved blade based on the completed personal tailored curved hockey stick blade, or interact with the blade parts or the partially or fully assembled personal tailored curved hockey stick blade. Interacting with the blade parts or the partially or fully assembled personal tailored curved hockey stick blade is possible from any of the user interfaces (not only the VR virtual world interface) and include interactions whereby the user can change a view from top to bottom, change display and viewing orientation of a selected blade part or the personal tailored curved hockey stick blade from left to right, top to bottom, diagonally, etc., enlarge or zoom in, reduce size or zoom out, etc., display or hide meta-information related to blade parts, such as unique identifiers, display projected hockey puck movement as animation based on assembled blade parts, obtain recommended blade part suggestions during selection, etc.

Thus, when the user is connected over the Internet to the web server computer 1140 and is accessing the ice hockey stick template cloud application service for creating a personal tailored curved hockey stick blade, the user is able to make selections of blade parts via the virtual ice hockey stick template tool 1150. While the user is making selections of blade parts, the blade part selection filtering engine 1170 runs automatically (as a background, non-visible service running on a processing unit of the web server computer 1140) to filter the available blade parts the user can select based on prior blade selection(s). The blade part selection filtering engine 1170 does this by obtaining unique identifier data for each blade part selection the user makes by utilizing the virtual ice hockey stick template tool 1150. Once the blade part selection filtering engine 1170 has the unique identifier data for a selected blade part, the blade part selection filtering engine 1170 retrieves the blade part and unique identifier(s) from the blade parts and unique identifiers database 1180 and checks the pattern name LUT 1160 for other unique identifiers that match the unique identifier data for the selected part. The blade part selection filtering engine 1170 then retrieves the blade parts data with matching unique identifiers and transfers the retrieved blade parts data with matching unique identifiers to the virtual ice hockey stick template tool 1150 (via the ice hockey stick template cloud application service running on the web server computer 1140) for visual display in the user interface presented to the user. Similarly, the virtual ice hockey stick template tool 1150 retrieves the selected blade part data from the blade parts and unique identifiers database 1180 and visually outputs the blade part in the user interface. The ice hockey stick template cloud application service for creating a personal tailored curved hockey stick blade also runs a rendering process that generates a view of the selected blade part and the partially or fully assembled personal tailored curved hockey stick blade based on computer graphics imagery (CGI) or live action images of blade parts and associated assemblies of the parts. Other computing device interfaces, such as VR and A/R interfaces, render composite imagery in 3D (for VR-based virtual worlds) or in overlay view (for A/R displays).

When a user has assembled a full personal tailored curved hockey stick blade by way of the virtual ice hockey stick template tool 1150, the user may optionally order a hockey stick to be made, manufactured, delivered, or otherwise created according to the personalized specifications of the completed design for the personal tailored curved hockey stick blade. When ordering, the user interacts with a payment gateway & transaction processor 1190 via the user interface which automatically encrypts all payment and personal information (e.g., address, name, height, age, preferred hand orientation, etc.) via the encryption module 1145. In some embodiments, the encryption module 1145 supports strong, secure encryption standards. In some embodiments, the encryption module supports at least 256-bit encryption. Examples of 256-bit encryption include, without limitation, SHA-256 and AES-256. In addition to encrypting data, the encryption module 1145 decodes or decrypts encrypted data. In this way, all user transaction, payment, and personal data is encrypted when ordering a custom hockey stick that has a custom curved blade that conforms the final design of the user's personal tailored curved hockey stick blade via the payment gateway & transaction processor 1190.

In some embodiments, the ice hockey stick template cloud application service running on the web server computer 1140 automatically retrieves the pattern name and curvilinear path data from the pattern name LUT 1160 with the curved path data based on the composite or combined total of the unique identifier data from the fully assembled blade parts, whether in two-part configuration, three-part configuration, four-part configuration, or any other configuration. The payment information, the user personal details, the pattern name and curvilinear path data are all encrypted by the encryption module 1145 and then archived into a single encrypted data package for ordering a custom hockey stick that has a custom curved blade that conforms the final design of the user's personal tailored curved hockey stick blade. When payment is confirmed at the payment gateway, the payment gateway & transaction processor 1190 then transmits the order information to a particular merchant, manufacturer, retailer, etc., as selected by the user or according to a default setting (e.g., an in-house commercial retailer that sends the order to an order fulfillment department of the same commercial retailer, whether in-house or located at a remote facility). In this way, any person can effectively order a custom blade for a hockey stick.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
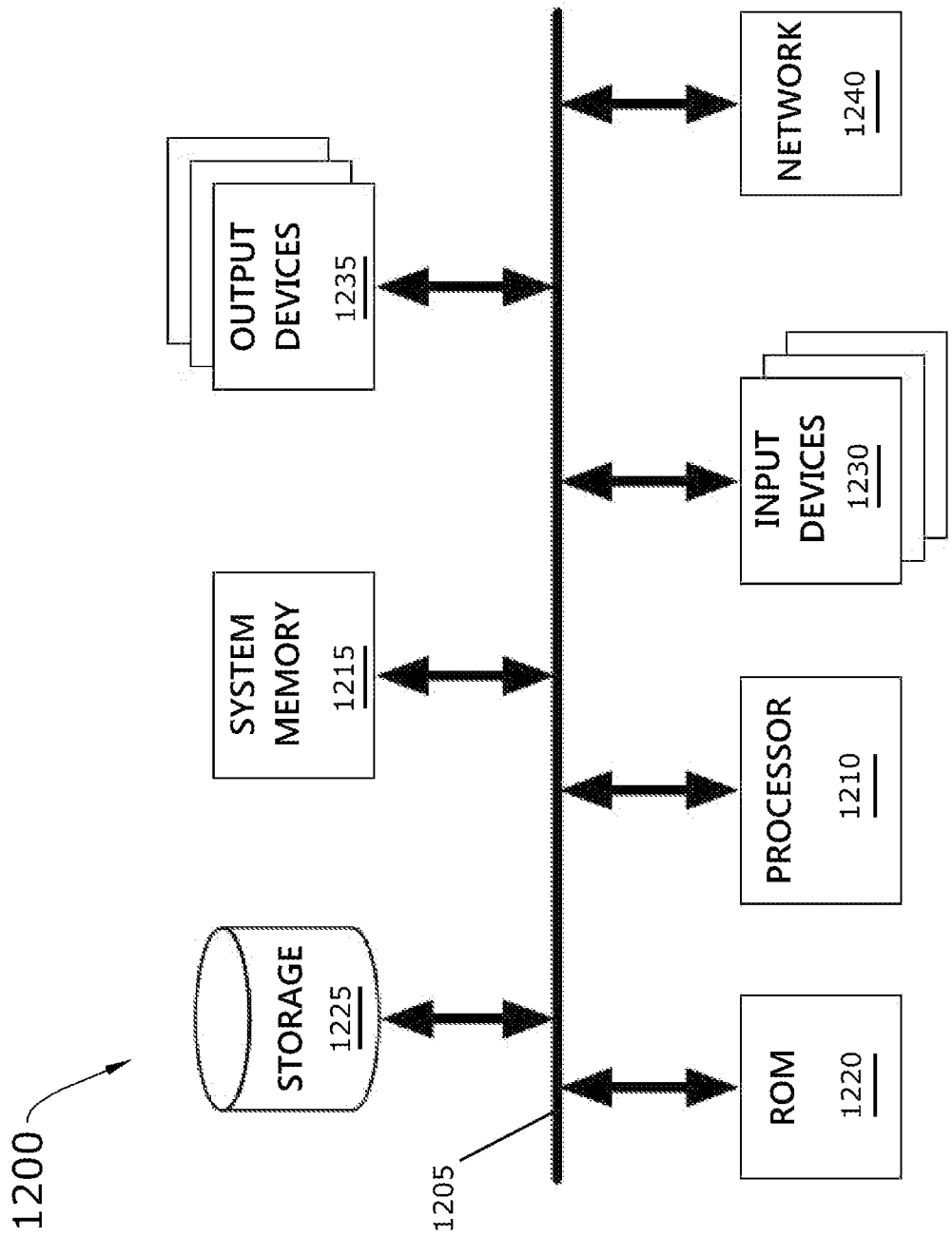
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer, a laptop, a server, a web server, a phone (cell phone, mobile phone, smartphone, etc.), a PDA (a smart watch, another wearable device or handheld computing device, etc.), a tablet computing device, or any other sort of electronic device or computing device. Such an electronic system includes various types of computer readable media and interfaces for various other types of computer readable media. Electronic system 1200 includes a bus 1205, processing unit(s) 1210, a system memory 1215, a read-only memory 1220, a permanent storage device 1225, input devices 1230, output devices 1235, and a network 1240.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1220, the system memory 1215, and the permanent storage device 1225.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1220 stores static data and instructions that are needed by the processing unit(s) 1210 and other modules of the electronic system. The permanent storage device 1225, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1225.

Other embodiments use a removable storage device (such as a flash drive) as the permanent storage device 1225. Like the permanent storage device 1225, the system memory 1215 is a read-and-write memory device. However, unlike storage device 1225, the system memory 1215 is a volatile read-and-write memory, such as a random access memory. The system memory 1215 stores some of the instructions and data that the processor needs at runtime. In some embodiments, the invention's processes are stored in the system memory 1215, the permanent storage device 1225, and/or the read-only memory 1220. For example, the various memory units include instructions for processing appearance alterations of displayable characters in accordance with some embodiments. From these various memory units, the processing unit(s) 1210 retrieves instructions to execute and data to process in order to execute the processes of some embodiments.

The bus 1205 also connects to the input and output devices 1230 and 1235. The input devices enable the user to communicate information and select commands to the electronic system. The input devices 1230 include alphanumeric keyboards and pointing devices (also called "cursor control devices"). The output devices 1235 display images generated by the electronic system 1200. The output devices 1235 include printers, such as 3D printers, and display devices, such as liquid crystal displays (LCD), organic light emitting diode (OLED) displays, virtual reality (VR) goggles, etc. Some embodiments include devices such as a touchscreen that functions as both input and output devices.

Finally, as shown in FIG. 12, bus 1205 also couples electronic system 1200 to a network 1240 through a network adapter (not shown). In this manner, the computer can be a part of a network of computers (such as a local area network ("LAN"), a wide area network ("WAN"), or an intranet), or a network of networks (such as the Internet). Any or all components of electronic system 1200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates physical and virtual processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An ice hockey stick template system comprising:
a plurality of interchangeable blade parts from which a user may select individual blade parts to assemble a personal tailored curved hockey stick blade;
an ice hockey stick template tool for creating a personalized curved blade by selections of at least two interchangeable blade parts from the plurality of different interchangeable blade parts;
a blade part selection filtering engine configured to identify matching combinations of interchangeable blade parts based on prior blade part selections and filter blade parts available for selection in the ice hockey stick template tool to only the interchangeable blade parts of the identified matching combinations of interchangeable blade parts;
a database that stores all combinations of interchangeable blade parts, blade parts data of each individual interchangeable blade part, and unique identifiers (UIDs) corresponding to the individual interchangeable blade parts; and
a payment gateway and order transaction processor that processes order transactions of hockey sticks that are incorporated into a personal tailored curved hockey stick blade as created via the ice hockey stick template tool.

2. The ice hockey stick template system of claim 1, wherein the plurality of blade parts comprise a plurality of different interchangeable blade heel parts and a plurality of different interchangeable blade toe parts.

3. The ice hockey stick template system of claim 2, wherein each blade toe part includes a toe connector that is configured to interlock with a heel connector of a blade heel part.

4. The ice hockey stick template system of claim 2, wherein the plurality of blade parts further comprise a plurality of different interchangeable mid blade parts.

5. The ice hockey stick template system of claim 4, wherein each mid blade part comprises a mid-heel connector and a mid-toe connector, wherein each blade toe part comprises a toe-mid connector, wherein each blade heel part comprises a heel-mid connector.

6. The ice hockey stick template system of claim 5, wherein the mid-toe connector of each mid blade part is configured to interlock with at least one uniquely identified toe-mid connector of a corresponding blade toe part.

7. The ice hockey stick template system of claim 5, wherein the mid-heel connector of each mid blade part is configured to interlock with at least one uniquely identified heel-mid connector of a corresponding blade heel part.

8. The ice hockey stick template system of claim 1, wherein user selections of a particular blade heel part, a particular mid blade part, and a particular blade toe part via the ice hockey stick template tool are recorded and stored in the database as a customized blade reference for a particular player.

9. The ice hockey stick template system of claim 8, wherein the customized blade reference is used to create a hockey stick with a personalized curved blade by one of a 3D printing process and manufacturing by an external manufacturing facility after completion of an order transaction by the user via the payment gateway and order transaction processor.

10. The ice hockey stick template system of claim 1 further comprising a web server computer that hosts an ice hockey stick template cloud application service for creating a personal tailored curved hockey stick blade, said web server computer comprising an encryption module, wherein the ice hockey stick template tool is accessible as a graphical tool on a website provided by the web server computer, wherein the database is communicably connected to the web server computer and also stores a pattern name look-up table (LUT) that combines UIDs of interchangeable blade parts in configurable blade patterns that are allowed for creation of the personal tailored curved hockey stick blade, wherein the payment gateway and order transaction processor is communicably connected to the web server computer and utilizes the encryption module of the web server computer to encrypt all order data and personal user data for all order transactions.

11. The ice hockey stick template system of claim 10, wherein the blade part selection filtering engine is further configured to retrieve, from the database, the UID corresponding to each selected blade part and identify matching UIDs in the pattern name LUT for the interchangeable blade parts identified in the matching combination of interchangeable blade parts.

12. The ice hockey stick template system of claim 11, wherein the blade part selection filtering engine is further configured to retrieve specific blade parts data from the database based on the matching UIDs and corresponding to the matching combination of interchangeable blade parts and transfer the specific blade parts data to the website for visual display in a graphical user interface (GUI) of the website that provides user access to the ice hockey stick template tool.

13. The ice hockey stick template system of claim 1, wherein a curvilinear path pattern is derived from user selections of a plurality of interchangeable blade parts.

14. The ice hockey stick template system of claim 13, wherein the curvilinear path pattern is recorded and stored in the database as a customized blade reference for a particular player.

15. The ice hockey stick template system of claim 13, wherein the curvilinear path pattern comprises curved path data that is added to a pattern name look-up table (LUT) stored in the database.

\* \* \* \* \*